(12) United States Patent
Chen et al.

(10) Patent No.: US 9,288,350 B1
(45) Date of Patent: Mar. 15, 2016

(54) POCKET SCANNER

(71) Applicant: Foxlink Image Technology Co., Ltd., New Taipei (TW)

(72) Inventors: Chi Wen Chen, New Taipei (TW); Chun Yuan Sun, New Taipei (TW); Chia Hsiang Wang, New Taipei (TW); Yen Chi Wu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 14/590,274

(22) Filed: Jan. 6, 2015

(51) Int. Cl.
*H04N 1/00* (2006.01)
*H04N 1/028* (2006.01)

(52) U.S. Cl.
CPC ....... *H04N 1/00557* (2013.01); *H04N 1/00525* (2013.01); *H04N 1/00551* (2013.01); *H04N 1/02835* (2013.01)

(58) Field of Classification Search
USPC .................................................. 358/1.1–1.18
See application file for complete search history.

(56) References Cited

U.S. PATENT DOCUMENTS 7,331,717 B2 *   2/2008   Kiani et al. .................... 385/53
8,856,033 B2 *  10/2014   Hicks et al. ................... 705/17

* cited by examiner

*Primary Examiner* — Douglas Tran
(74) *Attorney, Agent, or Firm* — Lin & Associates Intellectual Property, Inc.

(57) ABSTRACT

A pocket scanner includes a printed circuit board (PCB) assembly, an optical engine module electrically connected to the PCB assembly, and a cover assembly enclosing the optical engine module and the PCB assembly. The optical engine module includes a frame of which a bottom is opened with a scanning window. A top of the frame is designed with a slant plane slantwise facing the scanning window. The PCB assembly includes a control PCB placed above the optical engine module and perpendicular with the scanning window, a bracket mounted to the control PCB, and a battery module received in the bracket and electrically connected to the control PCB. A bottom of the control PCB is designed with a slant edge corresponding to the slant plane. The slant edge is against the slant plane when assembly. The cover assembly defines a scanning opening corresponding to the scanning window for scanning an original therethrough.

10 Claims, 4 Drawing Sheets

POCKET SCANNER

BACKGROUND OF THE INVENTION

1. Field of the Invention

The present invention relates to a scanner, and more particularly to a pocket scanner.

2. the Related Art

A traditional handheld scanner, where the optical elements are arranged in a line, scans a horizontal line of an original in a same time or in a same program. Therefore, the length of the line where the optical elements are must be longer than that of the horizontal line of the original. As a result, the appearance of the handheld scanner is too long to carry inconveniently.

A traditional mouse-shaped scanner has two-dimensional array type optical elements and position sensors. The mouse-shaped scanner firstly converts the original into a plurality of small frame images and then joints the plurality of small frame images into a complete digital image. Thereby, the mouse-shaped scanner achieves a greatly shortened length, but still its appearance is limited by the length, width and height of a mouse. Furthermore, the position of an optical engine module and a printed circuit board (PCB) assembly in the mouse-shaped scanner has a crucial influence on appearance size of the mouse.

Therefore, the present invention is to provide a pocket scanner direct at the shortage of existing technology. The pocket scanner has an advantage of small size for the convenience of carrying.

SUMMARY OF THE INVENTION

Accordingly, an object of the present invention is to provide a pocket scanner for converting an original to a digital image. The pocket scanner includes an optical engine module, a PCB assembly and a cover assembly. The optical engine module includes a frame. A bottom of the frame defines an elongated scanning window. The long side of the scanning window is parallel with the long side of the bottom of the frame. A top of the frame of the optical engine module is designed with a slant plane slantwise facing the scanning window. The PCB assembly includes a control PCB, a bracket and a battery module. The control PCB is located above the optical engine module and perpendicular with the scanning window. A bottom of the control PCB is designed with a slant edge corresponding to the slant plane of the optical engine module. The slant edge of the control PCB is against the slant plane of the optical engine module when assembly. The bracket is mounted to a side of the control PCB and above the optical engine module. One side of the bracket back to the control PCB is opened with a receiving cavity. The battery module is received in the receiving cavity and electrically connected to the control PCB. The cover assembly encloses the optical engine module and the PCB assembly. The cover assembly includes a bottom cover, a top cover and two side covers. The optical engine module is mounted on the bottom cover. The top cover covers on the bottom cover. The two side covers are respectively covered to two sides of the bottom cover and the top cover. The bottom cover is opened with a scanning opening corresponding to the scanning window of the optical engine module. A glass is equipped in the scanning opening. The optical engine module is electrically connected to the PCB assembly and scans the original through the scanning opening and the scanning window to obtain image information. The control PCB of the PCB assembly receives and processes the image information into the digital image.

As described above, the top of the frame of the optical engine module is designed with the slant plane, and the bottom of the control PCB is designed with the slant edge corresponding to the slant plane of the optical engine module. The slant edge of the control PCB is against the slant plane of the optical engine module to realize a minimum of occupied space in the frame when assembly. Therefore, the pocket scanner has an advantage of small size for the convenience of carrying.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
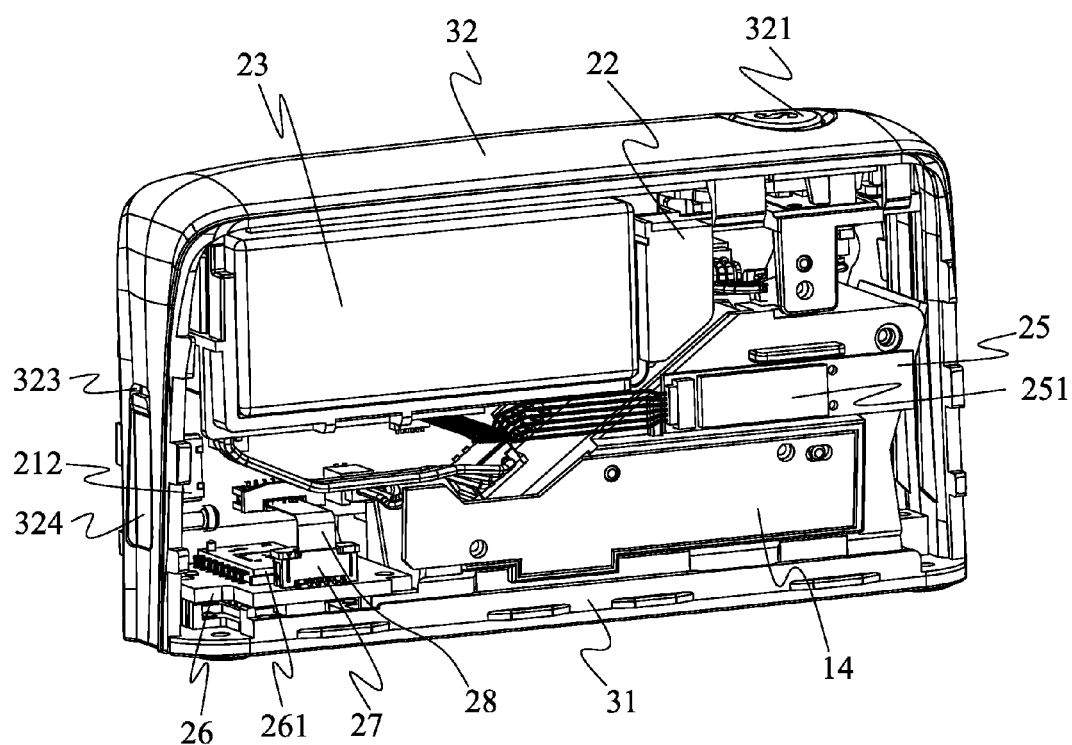
FIG. 1 is an assembled, perspective view of a pocket scanner in accordance with an embodiment of the present invention.
Figure 2:
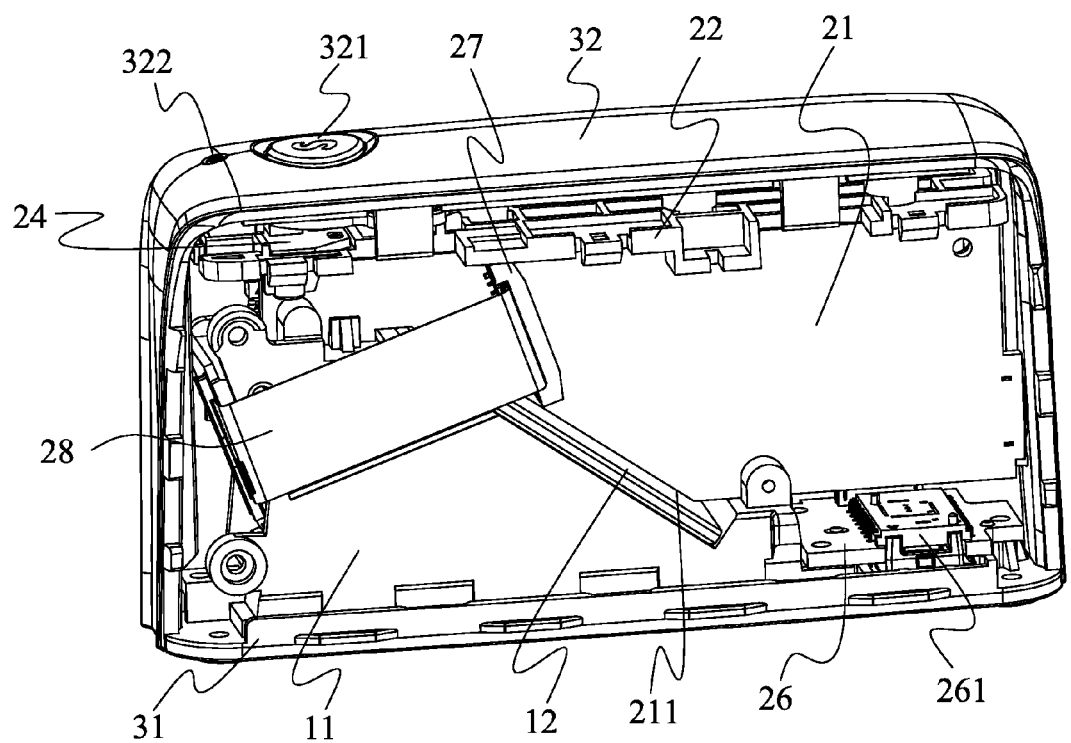
FIG. 2 is another assembled, perspective view of the pocket scanner shown in FIG. 1.
Figure 3:
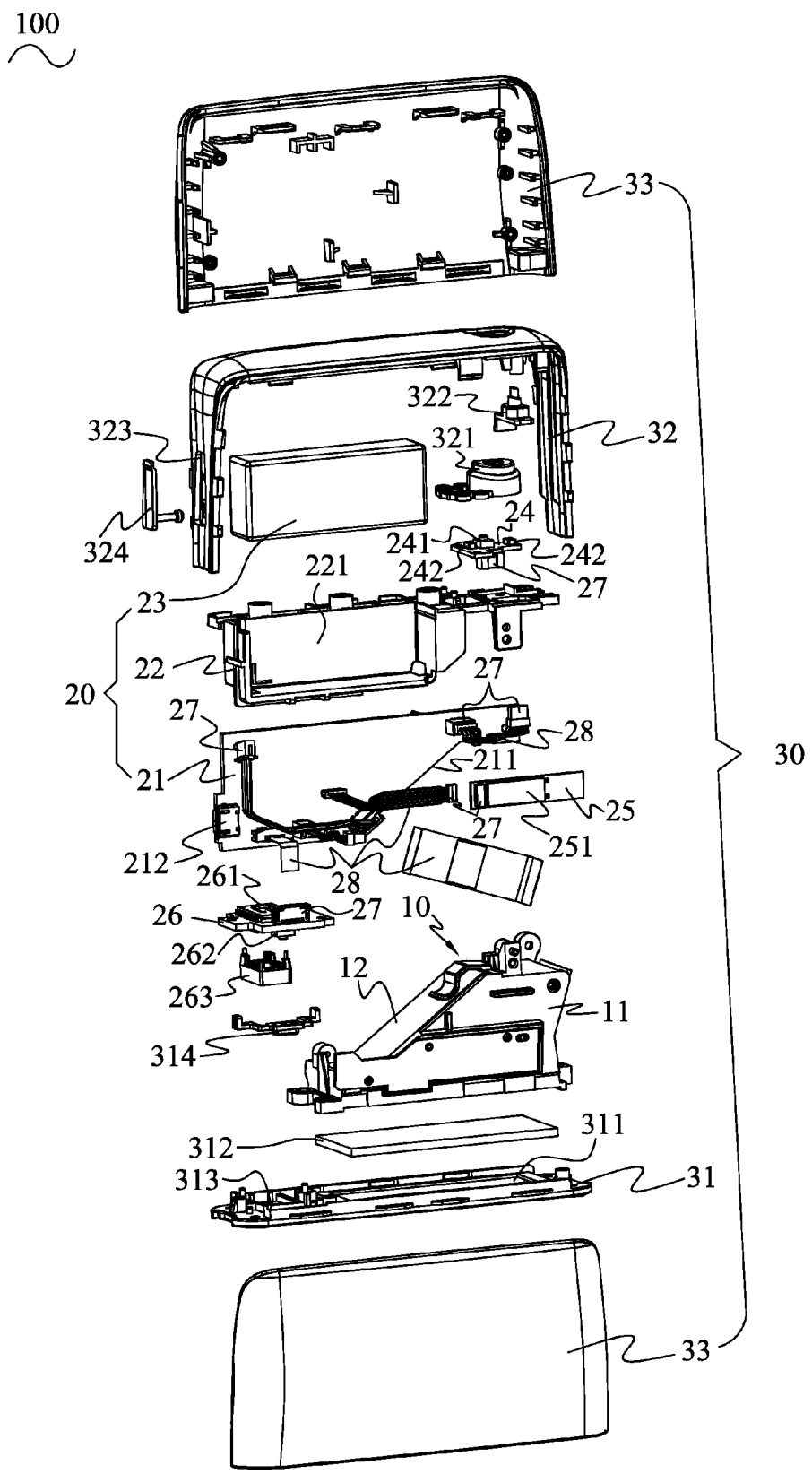
FIG. 3 is an exploded, perspective view of the pocket scanner in accordance with the embodiment of the present invention.
Figure 4:
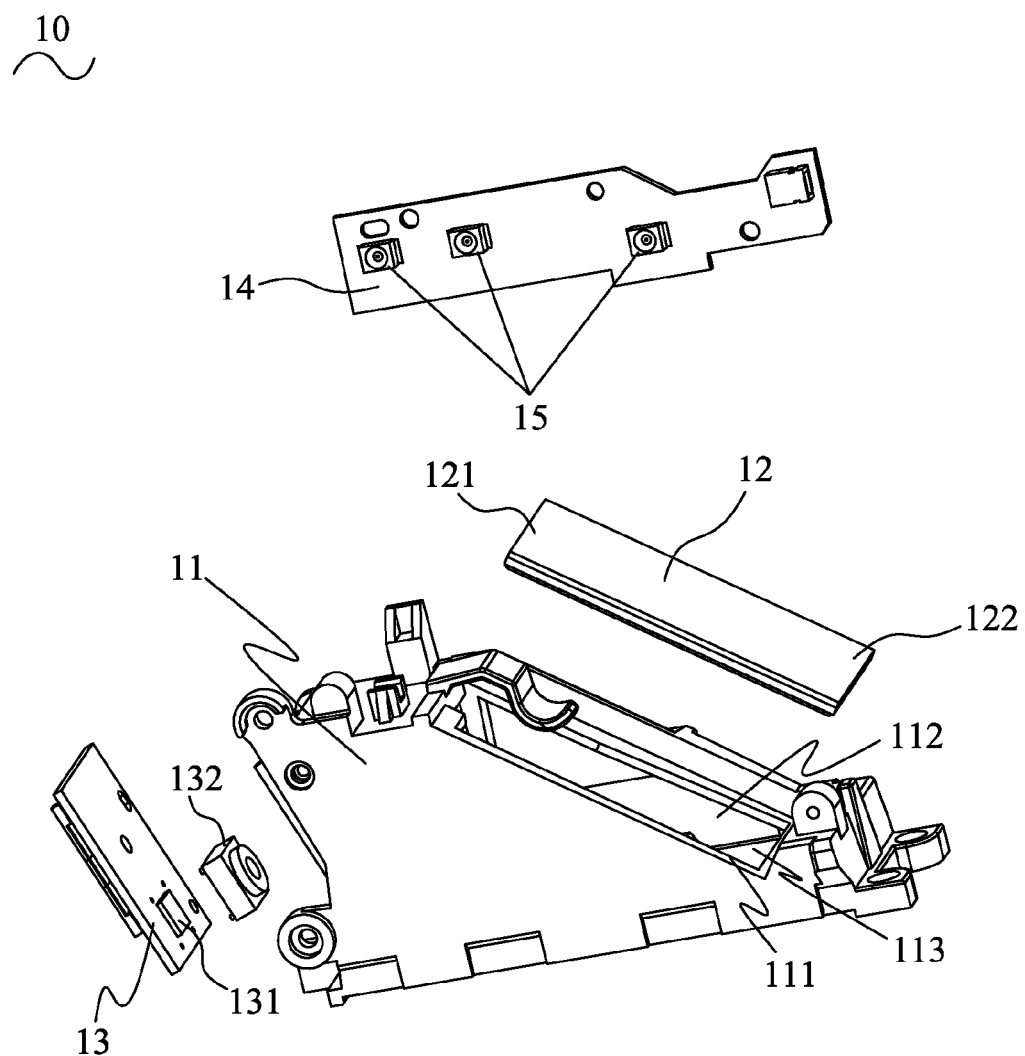
FIG. 4 is an exploded, perspective view of an optical engine module of the pocket scanner shown in FIG. 3.

Referring to the drawings in greater detail, and first to FIG. 3, an embodiment of the present invention is embodied in a pocket scanner 100 for converting an original to a digital image. The pocket scanner 100 includes an optical engine module 10, a PCB assembly 20 and a cover assembly 30. The optical engine module 10 is electrically connected to the PCB assembly 20.

Referring to FIGS. 1 to 4, the optical engine module 10 includes a frame 11. A bottom of the frame 11 defines an elongated scanning window 113. The long side of the scanning window 113 is parallel with the long side of the bottom of the frame 11. A top of the frame 11 of the optical engine module 10 is designed with a slant plane 111 slantwise facing the scanning window 113. The slant plane 111 of the optical engine module 10 is opened with a through slot 112 penetrating through the slant plane 111. The optical engine module 10 further includes a retroreflector 12 buckled in the through slot 112 of the slant plane 111 and forming a high portion 121 and a low portion 122. The retroreflector 12 is used to change the path of light. An inner side of the frame 11 facing the high portion 121 of the retroreflector 12 is equipped with an image PCB 13. The image PCB 13 is electrically connected to the PCB assembly 20. An inner side of the image PCB 13 facing the retroreflector 12 is equipped with an image sensor 131 and an image lens 132 mounted outside the image sensor 131. The image lens 132 is used to focus image information from the original to the image sensor 131 through the scanning window 113 and then by the reflection of the retroreflector 12. The image sensor 131 changes the image information into voltage signals and sends the voltage signals to the PCB assembly 20. The PCB assembly 20 converts the voltages signals to the digital image. One side wall of the frame 11 adjacent to the scanning window 113, the retroreflector 12 and the image PCB 13 is equipped with a light PCB 14. The light PCB 14 is electrically connected to the PCB assembly 20. An inner side of the light PCB 14 is equipped with a plurality of light sources 15. The light sources 15 illuminate an inner space of the frame 11 and partly illuminate on the original through the scanning window 113 of the frame 11 of the optical engine module 10. In the embodiment of the present invention, the light sources 15 include three Light Emitting Diodes. The illumination distribution depends on the location distribution of the three Light Emitting Diodes.

The PCB assembly 20 includes a control PCB 21, a bracket 22 and a battery module 23. The control PCB 21 is located above the optical engine module 10 and perpendicular with the scanning window 113. A bottom of the control PCB 21 is designed with a slant edge 211 corresponding to the slant plane 111 of the optical engine module 10. The slant edge 211 of the control PCB 21 is against the slant plane 111 of the optical engine module 10 to realize a minimum of occupied space in the frame 11 when assembly. The bracket 22 is mounted to a side of the control PCB 21 and above the optical engine module 10. One side of the bracket 22 back to the control PCB 21 is opened with a receiving cavity 221. The battery module 23 is received in the receiving cavity 221 and electrically connected to the control PCB 21. The battery module 23 provides voltage to the control PCB 21 for working. In the embodiment of the present invention, the battery module 23 is a rechargeable battery module.

The PCB assembly 20 further includes a button PCB 24 horizontally mounted on the bracket 22 and the optical engine module 10 and far away from the battery module 23. The button PCB 24 is electrically connected to the control PCB 21. A scanning switch 241 and at least one indicator light 242 are mounted on a top face of the button PCB 24.

The PCB assembly 20 further includes a wireless PCB 25. The wireless PCB 25 is mounted on an outside wall of the optical engine module 10 adjacent to the battery module 23. The wireless PCB 25 is perpendicular with the scanning window 113. The wireless PCB 25 is electrically connected to the control PCB 21. The wireless PCB 25 is equipped with a wireless transmit module 251 for exchanging data with external equipment. In the embodiment of the present invention, the wireless transmit module 251 is a bluetooth module.

The cover assembly 30 encloses the optical engine module 10 and the PCB assembly 20. The cover assembly 30 includes a bottom cover 31, a top cover 32 and two side covers 33. The optical engine module 10 is mounted on the bottom cover 31. The bottom cover 31 is opened with a scanning opening 311 corresponding to the scanning window 113 of the optical engine module 10. The optical engine module 10 scans the original through the scanning opening 311 and the scanning window 113 to obtain the image information of the original. The control PCB 21 of the PCB assembly 20 receives and processes the image information into the digital image. A glass 312 is equipped in the scanning opening 311 to prevent other objects into the optical engine module 10. The PCB assembly 20 further includes a laser PCB 26 electrically connected to the control PCB 21. The laser PCB 26 is horizontally mounted on the bottom cover 31 under the battery module 23 and adjacent to the optical engine module 10. The laser PCB 26 is equipped with a laser sensor 261 and a laser lens 263 mounted outside the laser sensor 261 under the laser PCB 26. A power switch 262 is mounted on a bottom face of the laser PCB 26. The bottom cover 31 is opened with a laser hole 313 corresponding to the laser lens 312 of the laser PCB 26. The laser sensor 311 of the laser PCB 31 collects some information about the original through the laser hole 313 and the laser lens 312, and sends the some information to the control PCB 21 for providing an auxiliary position for the image information obtained by the optical engine module 10. The bottom cover 31 is equipped with a power button 314 corresponding to the power switch 262. The power button 314 sheathes outside of the power switch 262.

The top cover 32 of the cover assembly 30 covers on the bottom cover 31. The top cover 32 of the cover assembly 30 is equipped with a scanning button 321 covering the scanning switch 241 and one of the at least one indicator light 242 of the button PCB 24 of the PCB assembly 20. In use, pressing the scanning button 321 can trigger the scanning switch 241 to drive the pocket scanner 100 to start scanning. In the same time, the one of the at least one indicator light 242 under the scanning button 321 is lit to indicate the pocket scanner 100 is scanning. In the embodiment of the present invention, the scanning button 321 is movably mounted in the top cover 32 of the cover assembly 30 and located above the bracket 22 of the PCB assembly 20. The top cover 32 of the cover assembly 30 is further equipped with a light pipe 322. The light pipe 322 is located over another one of the at least one indicator light 242. When exchanging the data or charging the battery module 23, the another one of the at least one indicator light 242 under the light pipe 322 is lit or twinkles to indicate the relative working status.

The control PCB 21 of the PCB assembly 20 is equipped with a communication interface 212. The pocket scanner 100 can exchange the data with the external equipment through the communication interface 212. The top cover 32 of the cover assembly 30 is opened with a through hole 323 corresponding to the communication interface 212. The communication interface 212 is received in the through hole 323. The top cover 32 of the cover assembly 30 is further equipped with a protective cover 324 corresponding to the through hole 323. The protective cover 324 is buckled in the through hole 323 to cover the communication interface 212.

The two side covers 33 are respectively covered to two sides of the bottom cover 31 and the top cover 32. In the embodiment of the present invention, the two side covers 33 of the cover assembly 30 are openable for the convenience of changing the battery module 23.

In the embodiment of the present invention, all of the PCBs are equipped with connectors 27 which are electrically connected through connecting lines 28 to realize electrical connection among the PCBs.

As described above, the top of the frame 11 of the optical engine module 10 is designed with the slant plane 111, and the bottom of the control PCB 21 is designed with the slant edge 211 corresponding to the slant plane 111 of the optical engine module 10. The slant edge 211 of the control PCB 21 is against the slant plane 111 of the optical engine module 10 to realize a minimum of occupied space in the frame 11 when assembly. Therefore, the pocket scanner 100 has an advantage of small size for the convenience of carrying.

What is claimed is:

1. A pocket scanner for converting an original to a digital image, comprising:

an optical engine module including a frame, a bottom of the frame defining an elongated scanning window, the long side of the scanning window being parallel with the long side of the bottom of the frame, a top of the frame of the optical engine module being designed with a slant plane slantwise facing the scanning window;

a printed circuit board (PCB) assembly including a control PCB, a bracket and a battery module, the control PCB being located above the optical engine module and perpendicular with the scanning window, a bottom of the control PCB being designed with a slant edge corresponding to the slant plane of the optical engine module, the slant edge of the control PCB being against the slant plane of the optical engine module when assembly, the bracket being mounted to a side of the control PCB and above the optical engine module, one side of the bracket back to the control PCB being opened with a receiving cavity, the battery module being received in the receiving cavity and electrically connected to the control PCB; and a cover assembly enclosing the optical engine module and the PCB assembly, the cover assembly including a bottom cover, a top cover and two side covers, the optical engine module being mounted on the bottom cover, the top cover covering on the bottom cover, the two side covers being respectively covered to two sides of the bottom cover and the top cover, the bottom cover being opened with a scanning opening corresponding to the scanning window of the optical engine module, a glass being equipped in the scanning opening;

wherein the optical engine module is electrically connected to the PCB assembly and scans the original through the scanning opening and the scanning window to obtain image information, the control PCB of the PCB assembly receives and processes the image information into the digital image.

2. The pocket scanner as claimed in claim 1, wherein the PCB assembly further includes a laser PCB electrically connected to the control PCB, the laser PCB is horizontally mounted on the bottom cover under the battery module and adjacent to the optical engine module, the laser PCB is equipped with a laser sensor and a laser lens mounted outside the laser sensor under the laser PCB, the bottom cover is opened with a laser hole corresponding to the laser lens of the laser PCB, the laser sensor of the laser PCB collects some information about the original through the laser hole and the laser lens, and sends the some information to the control PCB for providing an auxiliary position for the image information obtained by the optical engine module.

3. The pocket scanner as claimed in claim 2, wherein a power switch is mounted on a bottom face of the laser PCB, the bottom cover is equipped with a power button corresponding to the power switch, the power button sheathes outside of the power switch.

4. The pocket scanner as claimed in claim 1, wherein the PCB assembly further includes a button PCB horizontally mounted on the bracket and the optical engine module and far away from the battery module, the button PCB is electrically connected to the control PCB, a scanning switch and at least one indicator light are mounted on a top face of the button PCB, the top cover of the cover assembly is equipped with a scanning button covering the scanning switch and one of the at least one indicator light of the button PCB, in use, pressing the scanning button can trigger the scanning switch to drive the pocket scanner to start scanning.

5. The pocket scanner as claimed in claim 4, wherein the top cover of the cover assembly is further equipped with a light pipe, the light pipe is located over another one of the at least one indicator light.

6. The pocket scanner as claimed in claim 1, wherein the control PCB of the PCB assembly is equipped with a communication interface, the top cover of the cover assembly is opened with a through hole corresponding to the communication interface, the communication interface is received in the through hole.

7. The pocket scanner as claimed in claim 6, wherein the top cover of the cover assembly is further equipped with a protective cover corresponding to the through hole, the protective cover is buckled in the through hole to cover the communication interface.

8. The pocket scanner as claimed in claim 1, wherein the PCB assembly further includes a wireless PCB, the wireless PCB is mounted on an outside wall of the optical engine module adjacent to the battery module, the wireless PCB is perpendicular with the scanning window, the wireless PCB is electrically connected to the control PCB, the wireless PCB is equipped with a wireless transmit module for exchanging data with external equipment.

9. The pocket scanner as claimed in claim 1, wherein the two side covers of the cover assembly are openable for the convenience of changing the battery module.

10. The pocket scanner as claimed in claim 1, wherein the slant plane of the optical engine module is opened with a through slot penetrating through the slant plane, the optical engine module further includes a retroreflector buckled in the through slot of the slant plane and forming a high portion and a low portion, an inner side of the frame facing the high portion of the retroreflector is equipped with an image PCB, the image PCB is electrically connected to the PCB assembly, an inner side of the image PCB facing the retroreflector is equipped with an image sensor and an image lens mounted outside the image sensor, the image lens is used to focus the image information from the original to the image sensor by the reflection of the retroreflector, the image sensor changes the image information into voltage signals and sends the voltage signals to the PCB assembly, the PCB assembly converts the voltages signals to the digital image, one side wall of the frame adjacent to the scanning window, the retroreflector and the image PCB is equipped with a light PCB, the light PCB is electrically connected to the PCB assembly, an inner side of the light PCB is equipped with a plurality of light sources, the light sources illuminate an inner space of the frame and partly illuminate on the original through the scanning window of the frame of the optical engine module.

\* \* \* \* \*